(12) United States Patent
Redfern

(10) Patent No.: US 7,313,130 B2
(45) Date of Patent: Dec. 25, 2007

(54) SPECTRALLY COMPATIBLE MASK FOR ENHANCED UPSTREAM DATA RATES IN DSL SYSTEMS

(75) Inventor: Arthur J. Redfern, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 976 days.

(21) Appl. No.: 10/404,238

(22) Filed: Apr. 1, 2003

(65) Prior Publication Data

US 2003/0198217 A1 Oct. 23, 2003

Related U.S. Application Data

(60) Provisional application No. 60/369,206, filed on Apr. 1, 2002.

(51) Int. Cl.
*H04L 12/66* (2006.01)
*H04J 1/00* (2006.01)

(52) U.S. Cl. ...................... 370/352; 370/484
(58) Field of Classification Search .............. 375/222, 375/219, 377; 370/352, 353–357, 359, 480, 370/483, 484, 482, 487, 493–495, 496, 498
See application file for complete search history.

(56) References Cited

U.S. PATENT DOCUMENTS 6,650,697 B1 * 11/2003 Tate et al. .................. 375/222

| 6,885,730 B1 * | 4/2005 | Bremer ................ 379/29.01 |
| 2002/0027900 A1 * | 3/2002 | Hjartarson et al. ....... 370/352 |
| 2002/0118733 A1 * | 8/2002 | Frenkel ................ 375/219 |
| 2003/0086514 A1 * | 5/2003 | Ginis et al. ............ 375/346 |

* cited by examiner

*Primary Examiner*—Firmin Backer
*Assistant Examiner*—Farah Faroul
(74) *Attorney, Agent, or Firm*—J. Dennis Moore; W. James Brady, III; Frederick J. Telecky, Jr.

(57) ABSTRACT

A method and apparatus for providing extended upstream data transmission in a band having a lowest frequency $f_0$ by an end user terminal unit in an asymmetric digital subscriber line communication between a central office terminal unit and the end user terminal unit, using a loop having a length. In the method, a target rate of upstream data transmission is provided. A plurality of sets of values are determined, of (1) an extension frequency $f_2$ that is higher than a frequency $f_1$ for upstream data transmission, $f_1$ being a frequency established for non-extended upstream data transmission, the region bounded by $f_1$ and $f_2$ being an extension band for upstream data transmission, and (2) a maximum power level $S_2$ for the extension band determined by the extension frequency in the set. Using both terminal units, a selection set of values is selected by performing a signal-to-noise ratio determination for each of the sets of values and determining the set of values that results in an upstream data rate that approximates the target rate. Data is transmitted upstream by the end user terminal unit using the selection set of values.

8 Claims, 6 Drawing Sheets

SPECTRALLY COMPATIBLE MASK FOR ENHANCED UPSTREAM DATA RATES IN DSL SYSTEMS

This application claims priority under 35 U.S.C. 119(e)(1) of provisional application No. 60/369,206, filed Apr. 1, 2002.

TECHNICAL FIELD OF THE INVENTION

This invention relates to digital data communications over telephone lines, and more particularly relates to methods and apparatus for enhancing upstream data transmission in asymmetric digital subscriber line communications.

BACKGROUND OF THE INVENTION

Asymmetric Digital Subscriber Line (ADSL) communications links are gaining in popularity and usage, usually for connection of an office or home computer to the Internet. ADSL communications equipment complies with a standard adopted by The Alliance For Telecommunications Industry Solutions (ATIS) in 1998. ATIS is a group accredited by the American National Standard Institute (ANSI). The ADSL standard used in North America is referred to as the ANSI T1.413 ADSL Standard, referred to herein as the T1.413 Standard, or, alternatively, the ADSL standard. As of the date of filing of this patent, essentially all new deployments of ADSL follow the ADSL standard. For more detailed information on the ADSL standard, see Palm (ed.), "G.dmt: asymmetrical digital subscriber line (ADSL) transceivers," ITU-T Study Group 15 Question 4, G.992.1, 1999.

The ADSL standard was adopted to provide a way of transmitting data at high rates, up to ~13 million bits per second, i.e., 13 Mbps, over twisted pair phone lines. The standard defines a discrete multi-tone (DMT) system that uses a number of "tones" or "sub-channels," within a defined total channel bandwidth, that are each 4.3125 KHz wide for transmission of data between a telephone company central office (CO) and an end-user at customer premises.

Existing ADSL methods, including an enhanced ADSL standard referred to as ADSL2+ {for more information on ADSL2+, see F. van der Putten (ed.), "Draft recommendation G.adslplus (for consent)," ITU-T Study Group 15 Question 4, G992.5, 2003}, divide the available channel bandwidth into two passbands, one for the downstream direction, i.e., from CO to end-user, and one for the upstream direction, i.e., from end-user to CO. The division is such that the achievable data rate in the downstream direction is much greater than that in the upstream direction. This corresponds to the usage requirements of many homes and offices, as it is typically more common to download information than to upload information.

However, there is a large group of users in both home offices and small businesses for which it is desirable to have a bandwidth split which is not as biased towards higher data rates in the downstream. For these users, who also upload a significant amount of information, it is desirable to have a more symmetric upstream and downstream rate partition than currently possible with ADSL or ADSL+.

However, it is not possible to simply re-allocate tones from downstream to upstream, for example, to achieve this goal. This is because the ADSL standard defines a power spectral density (PSD) for communication, by specifying a PSD mask not to be violated. In the telephone infrastructure, the twisted pairs of many end-users in an area are eventually gathered together in a bundle that extends to the CO. The limits specified in the PSD mask prevent undue interference of ADSL signals on a given twisted pair with ADSL or other communications on other twisted pairs in the same bundle. Such interference can occur by having transmitted signal energy from one twisted pair couple to another twisted pair and contribute to the signals being received from that twisted pair, an effect referred to as cross-talk. If the cross-talk energy is sufficiently large, it can overwhelm a receiver, and actually prevent communication on the affected twisted pair. PSD is typically specified in units of dBm/Hz. As is well known in the art, a dBm is a unit of power in decibels, relative to one milliwatt.

The ADSL Standard sets forth the following limits: for the upstream direction the passband is 25-138 kHz. Within this band the power spectral density (PSD) is specified to be −38 dBm/Hz. The lower limit of the downstream passband depends upon the type of communication (frequency division multiplexing, or, FDM, versus echo cancellation), but in either case, above 138 kHz the PSD is specified to be −40 dBm/Hz.

It would therefore be desirable to have a method for enhancing ADSL upstream data rates that is compatible with existing services.

SUMMARY OF THE INVENTION

In accordance with the present invention there is provided an apparatus and method for providing extended upstream data transmission in a band having a lowest frequency $f_0$ by an end user terminal unit in an asymmetric digital subscriber line communication between a central office terminal unit and the end user terminal unit. In the method, a target rate of upstream data transmission is provided. A plurality of sets of values are determined, of (1) an extension frequency $f_2$ that is higher than a frequency $f_1$ for upstream data transmission, $f_1$ being a frequency established for non-extended upstream data transmission, the region bounded by $f_1$ and $f_2$ being an extension band for upstream data transmission, and (2) a maximum power level $S_2$ for the extension band determined by the extension frequency in the set. From the estimated loop length, a selection set of values for $f_2$ and $S_2$ is determined. Both terminal units select from the set of values by performing a signal-to-noise ratio determination and determining the value which results in an upstream data rate that approximates the target rate. Data is transmitted upstream by the end user terminal unit using the selection set of values.

These and other features of the invention will be apparent to those skilled in the art from the following detailed description of the invention, taken together with the accompanying drawings.

DETAILED DESCRIPTION OF THE PREFERRED EMBODIMENT

The numerous innovative teachings of the present invention will be described with particular reference to the presently preferred exemplary embodiments. However, it should be understood that this class of embodiments provides only a few examples of the many advantageous uses and innovative teachings herein. In general, statements made in the specification of the present application do not necessarily delimit the invention, as set forth in different aspects in the various claims appended hereto. Moreover, some statements may apply to some inventive aspects, but not to others.

Figure 1A:
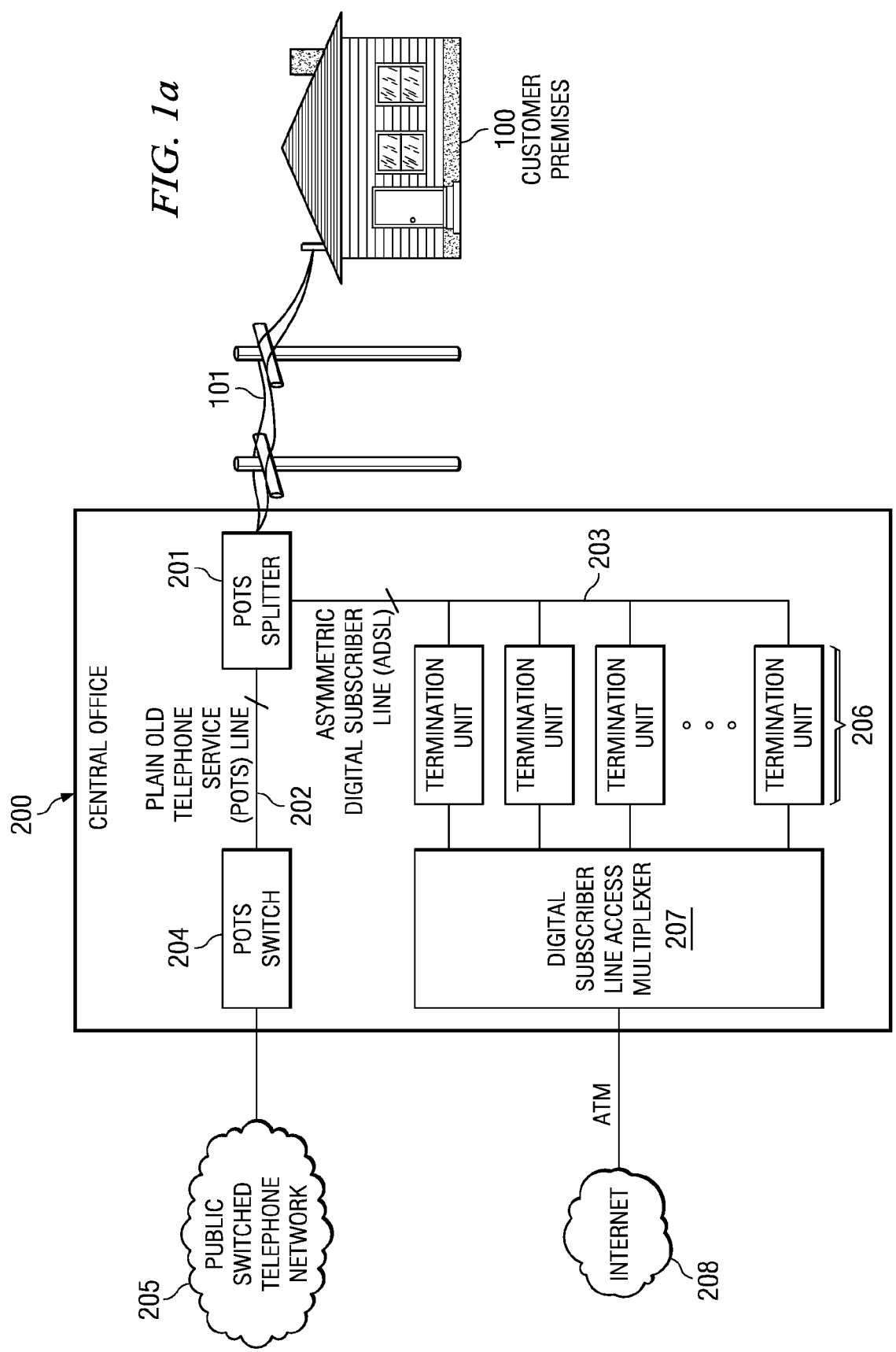
FIG. 1a is block diagram of the end-to-end system architecture of an ADSL connection, to which an embodiment of the present invention is applied.

FIG. 1*a* is block diagram of the end-to-end system architecture of ADSL, to which the present invention may be applied. Equipment at a customer premises 100 is connected to a CO 200 by twisted pair 101. At the CO 200, the twisted pair is routed to a POTS splitter 201, which splits POTS signals from ADSL signals and routes them respective POTS lines 202 and 203. The POTS lines are routed to a POTS switch 204, which directs the POTS signals to the public switched telephone network (PSTN) 205.

The ADSL lines are routed to respective ADSL Termination Units-Central Office (ATU-Cs) 206. The ATU-Cs 206 include ADSL modems, which retrieve the data being communicated by the equipment at the customer premises 100, and provide the data to a Digital Subscriber Line Access Multiplexer 207, which multiplexes the digital data streams from all of the ATU-Cs 206, and directs them as asynchronous transfer mode (ATM) signals to the Internet 208.

The POTS splitter 201 also combines POTS signals from the PSTN 205 with ADSL signals from the ATU-Cs 206, and directs the combined signals to the twisted pair 101.

Figure 1B:
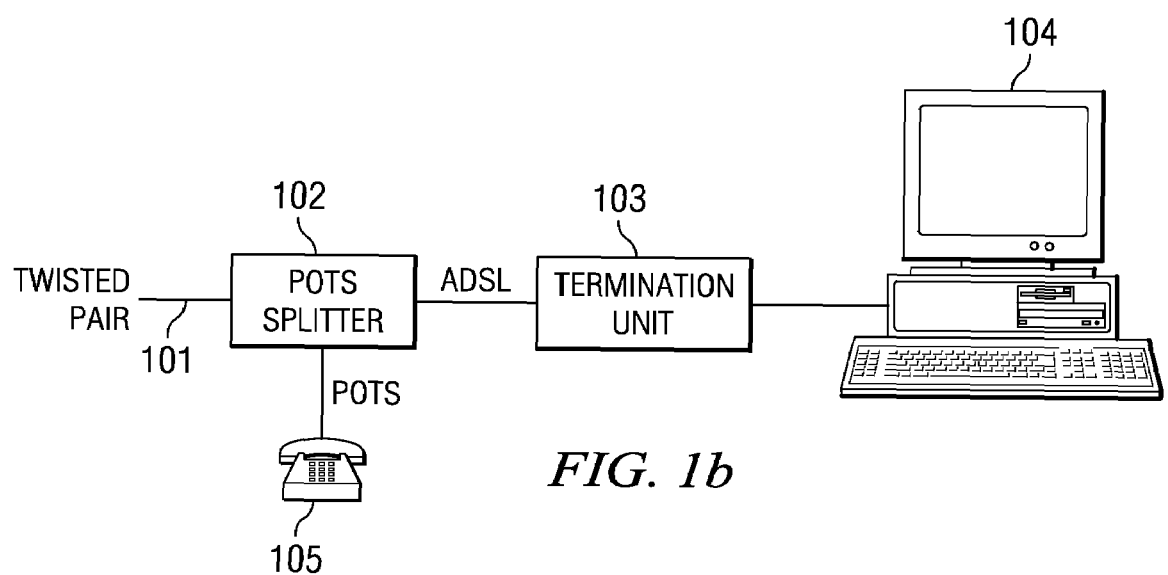
FIG. 1b is a block diagram of the ADSL architecture of FIG. 1a, at the customer premises.

FIG. 1*b* is a block diagram of the ADSL architecture at the customer premises 100. The twisted pair 101 is connected to a POTS splitter 102, which splits POTS signals from ADSL signals. The ADSL signals are directed to ADSL Termination Units-Remote (ATU-Rs) 103. The ATU-Rs 103 include ADSL modems, which retrieve the data being communicated from the Internet 208, and provide the data to equipment at the customer premises, for example a personal computer 104. The POTS signals are directed to units that use POTS signals, for example a telephone 105.

Figure 2:
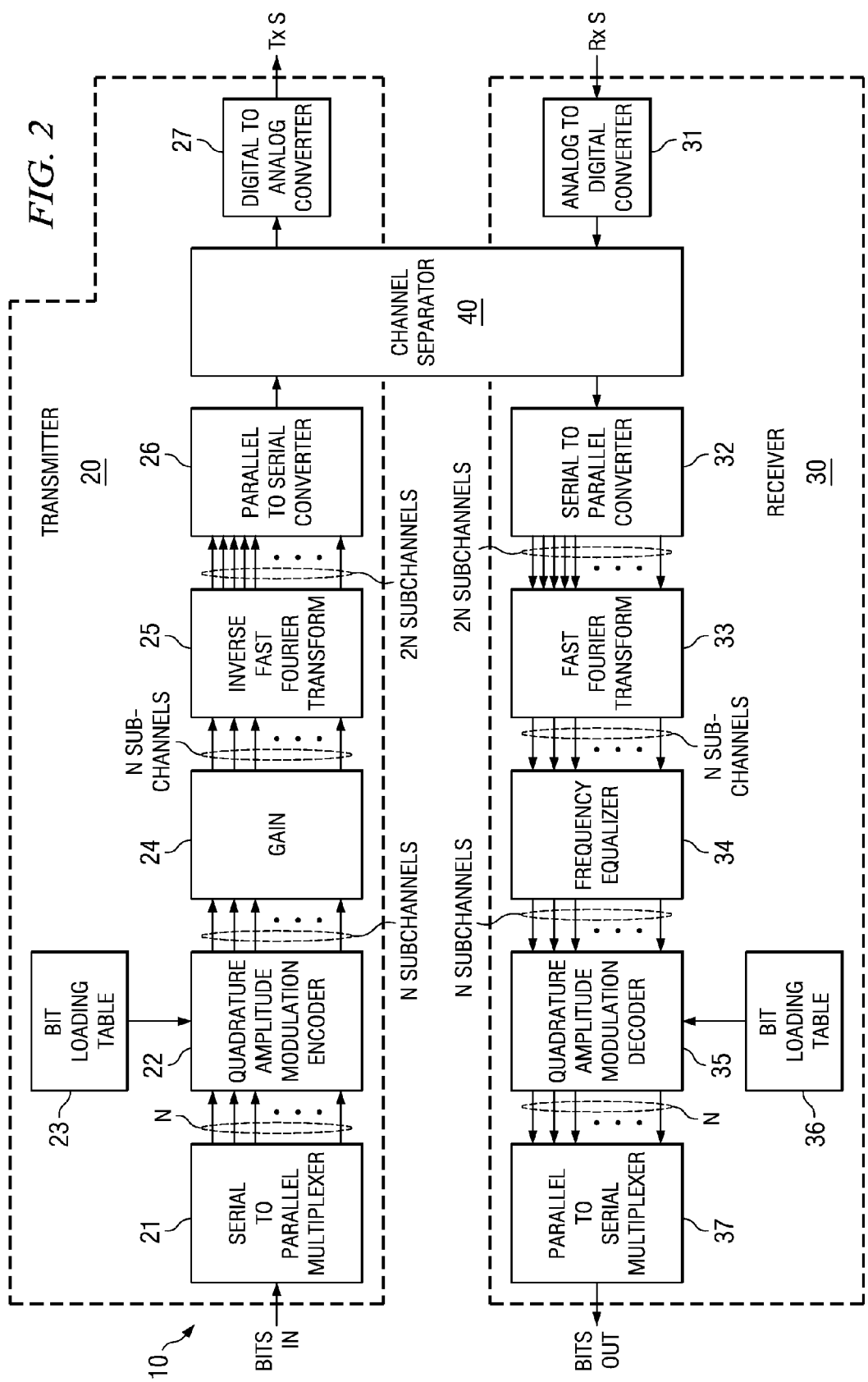
FIG. 2 is a block diagram of a representative prior art ADSL modem to which the method of the present invention may be applied

FIG. 2 is a block diagram of a representative prior art ADSL modem 10 to which the method of the present invention may be applied. It consists of a transmitter 20 and a receiver 30. In the transmitter 20 a serial stream of bits are received from a source (not shown) at a serial to parallel converter 21, which converts the serial bit stream into a parallel stream of bits N bits wide. The N-bit parallel bit stream from the serial to parallel converter are provided to a Quadrature Amplitude Modulation (QAM) encoder stage 22, which generates QAM symbols consisting of combined sine wave and cosine wave signals having their amplitudes and their phase modulated in accordance with the value of a respective bit to be represented. The QAM encoder stage 22 provides the QAM symbols thus generated on N subchannels. A bit loading table 23 defines the number of bits carried by a subchannel. The QAM symbol signals are provided to a gain stage 24 which amplifies the QAM symbol signals to accommodate the input requirements of the following stage, an Inverse Fast Fourier Transform (IFFT) stage 25. The IFFT stage 25 takes the QAM symbol signals, which are frequency domain samples, and converts them into time domain samples, which are provided on 2N subchannels. The expansion from N channels to 2N channels arises because the frequency domain signals have two components to represent a symbol—phase and amplitude, both of which must be represented in the time domain. The 2N parallel channels of time domain samples are provided to a parallel to serial converter 26, which converts them to a serial stream of time domain samples, which is provided to a channel separator 40. The channel separator implements the division of the twisted pair available channel bandwidth into the downstream band, the upstream band, and the "plain old telephone service" (POTS) band.

Figure 3A:
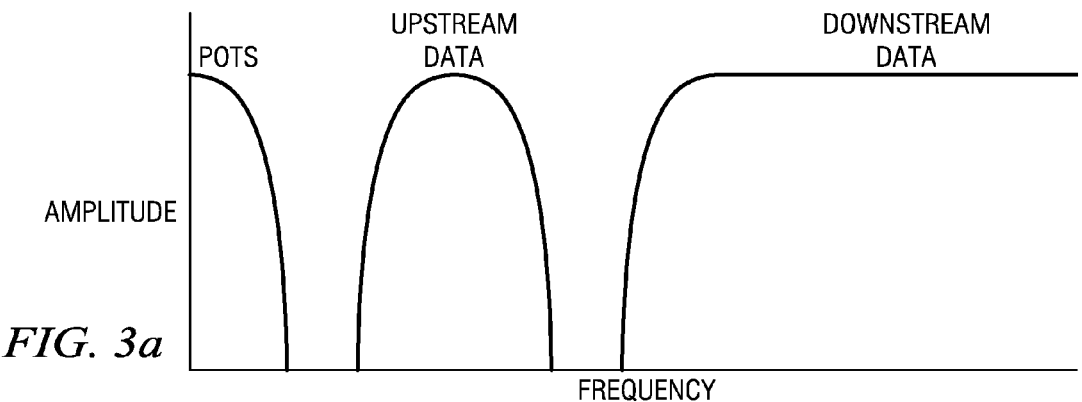
FIG. 3a is a graph of amplitude versus frequency showing an FDM channel spectrum.
Figure 3B:
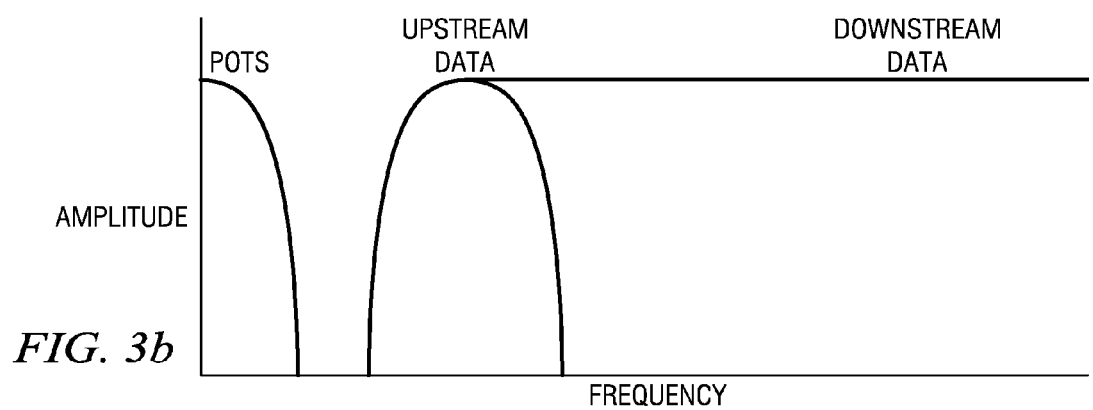
FIG. 3b is a graph similar to that of FIG. 3a, but showing an EC channel spectrum

The division of channel bandwidth may be done in either of two modes, frequency division multiplexing (FDM) and echo cancellation (EC). FIG. 3*a* is a graph of amplitude versus frequency showing an FDM channel spectrum, while FIG. 3*b* is a similar graph showing an EC channel spectrum. In both cases, the lowest part of the band is used by the POTS band. Above that is the upstream band. Depending on whether the channel separation is FDM or EC, the downstream band begins either above the top of the upstream band (for FDM) or coincident with the lower limit of the upstream band (EC). In both cases, the downstream band extends up to its determined upper limit. The channel separator 40 assigns the 2N time domain subchannels to tones in the appropriate band according to the division mode for the communication.

The above-described functions are typically implemented digitally, using a digital signal processor (DSP). Accordingly, the serial stream of time domain samples, which are digital signals, are provided by the channel separator 40 to a digital-to-analog (D/A) converter 27 which converts the time domain digital signals to an analog signal, and outputs it as the transmit signal.

The receiver 30 does somewhat the reverse of what occurs in the transmitter. Thus, the received signal is provided to an analog-to-digital (A/D) converter 31, which converts the analog received signal to a serial stream of digital signals. The channel separator 40 applies the appropriate filter in accordance with the division mode for the communication, and provides the digital signals to a serial to parallel converter 32, which converts the serial stream of digital signals to a parallel stream in 2N subchannels and provides them to a Fast Fourier Transform (FFT) stage 33. The received signals are ADSL signals, and are generated by the same process as described above. Thus, the digital signals on the 2N subchannels constitute time domain samples. The FFT stage 33 takes these time domain samples, and converts them into QAM symbol signals, which are frequency domain samples, on N subchannels. The QAM symbol signals are provided to a frequency equalizer (FEQ) stage 34, which compensates for distortions arising from frequency dependent amplitude and phase variations. The N subchannels of frequency compensated signals are provided to a QAM decoder stage 35, which decodes the data from the QAM symbol signals in each of the subchannels, and provides them as a parallel stream of bits N bits wide to a parallel to serial multiplexer 37. A bit loading table 36 corresponding to bit loading table 23 at the transmitter is used by the QAM decoder stage 35 to determine the number of bits carried by a subchannel. The parallel to serial multiplexer 37 converts the parallel stream of bits N bits wide into a serial bit stream, which is provided to the destination (not shown).

When an ATU-R modem first links to an ATU-C modem, a well-known initialization protocol is followed, in four phases. In the first phase, the "handshake," the modems determine the nature and capabilities of the modem to which they are linked. In the second phase, called "training," the receivers in the modems at each end of the line acquire the symbol stream, adjust receiver gain, perform symbol timing recovery, and train any equalizers. There is also an optional echo cancellation training step. In the third phase, the transceivers exchange capability information and perform detailed channel analysis. Based on the discovered channel characteristics, the ATU-C makes an offer of the bit rates and coding overhead that will be used for the connection. Other offers may follow, of different bit rates and coding overhead. The last phase of the initialization sets the final transmission rates in both the upstream and downstream directions for the connection. These final rates are determined based on calculated channel parameters measured during the third phase. The method of the present invention is advantageously set up during the initialization protocol, and the limits determined during that protocol imposed during "showtime," the actual data communication that follows.

In general, in the practice of the present invention, in order to effect an enhanced upstream data rate in an ADSL communication, a PSD limit, or mask, is determined for requirements of the specific ADSL communication mode and the loop length over which the communication is to occur. This mask used to control the amplitudes of signals transmitted during the upstream transmission, in order to make the transmission comply with the restrictions imposed by a spectrum management standard. The determination of the PSD mask will now be described. For further information on spectrum management standards, see C. Valenti (ed.), "Draft proposed American National Standard, spectrum management for loop transmission systems, issue 2," T1E1.4/2001-002R3, February 2002.

Figure 4:
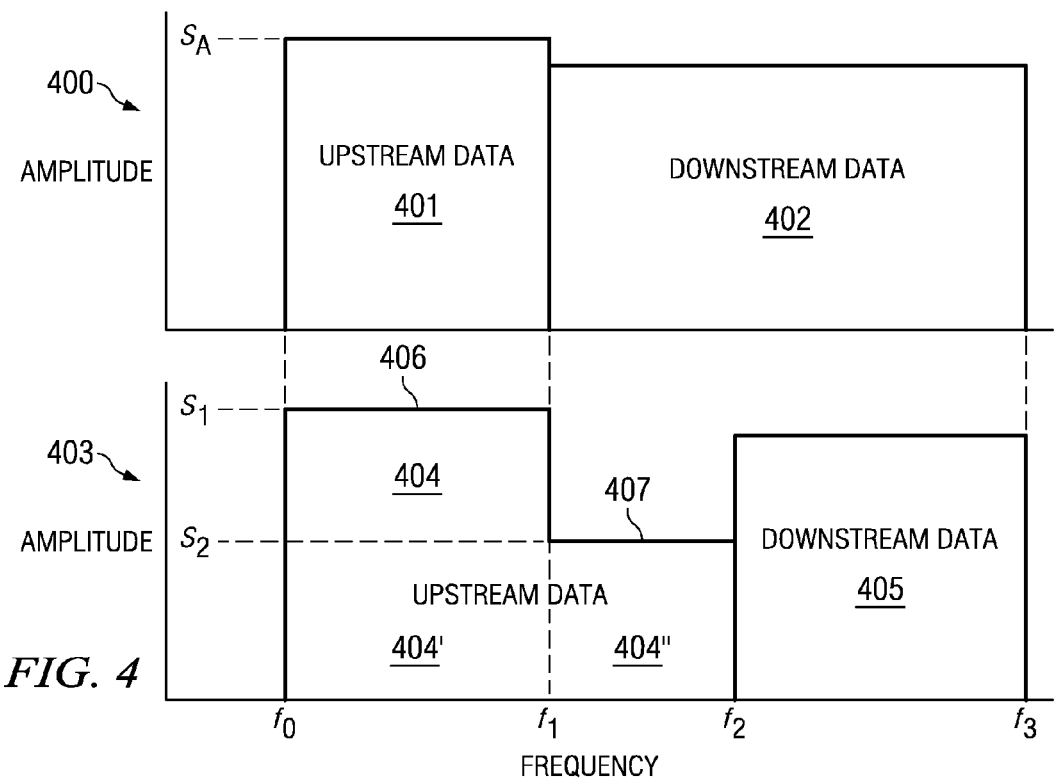
FIG. 4 shows two graphs, aligned by frequency, the upper graph showing an upstream mask and the bottom graph showing a downstream mask.

FIG. 4 includes two graphs. The upper graph in the figure shows a mask 400 for existing ADSL communications according to the currently adopted standard, including an upstream mask 401 in the upstream passband, and a downstream mask 402 in the downstream passband. The lower graph in the figure shows a mask 403 for communications conducted by the application of a preferred embodiment of the present invention, including an upstream mask 404 and a downstream mask 405. All masks are utilized in the gain stage 24, and, optionally, the channel separator 40 shown in FIG. 2, for the respective transmission. The masks are parameterized in terms of PSD levels and frequencies.

In the graph for existing ADSL communications (upper graph), the lowest frequency of the upstream passband is shown as $f_0$, the highest frequency of the upstream passband, which is the same as the lowest frequency of the downstream passband, is shown as $f_1$, and the highest frequency of the downstream passband is shown as $f_3$. Note that a guard band could exist between the highest frequency in the upstream passband and the lowest frequency in the downstream passband, in which case $f_1$ would be effectively split between the two. A "flat" PSD mask is specified for existing ADSL communications, for both the upstream passband and the downstream passband, with both having a constant maximum allowed power level, $S_A$, for all frequencies in the respective bands, which, as mentioned above, is −38 dBm/Hz for the upstream band and −40 dBm/Hz for the downstream band.

In the graph for communications according to the preferred embodiment of the present invention (lower graph), a PSD mask is specified for the upstream passband that has two PSD regions, 404' and 404". Region 404' has a maximum power level of $S_1$, while region 404" has a maximum power level of $S_2$. By limiting $S_2$ to a level determined in accordance with the present invention, more upstream data bandwidth can be provided, while interference with other communications kept at acceptable levels.

The total power P provided by the upstream mask 404 is:

$$P = S_1(f_1 - f_0) + S_2(f_2 - f_1), \qquad \text{Eq. (1)}$$

where $f_0$ is the lowest frequency in the upstream band, $f_1$ is the cutoff frequency of the upstream band, $f_2$ is the cutoff frequency of the downstream band, i.e., the crossover frequency, $S_1$ is the maximum allowed power level in upstream band 404' and $S_2$ is the maximum allowed power level in upstream band 404". Once P, $f_0$, $f_1$, $f_2$ and $S_2$ are chosen, then S1 is determined by:

$$S_1 = \frac{P - S_2(f_2 - f_1)}{f_1 - f_0}. \qquad \text{Eq. (2)}$$

Spectral compatibility requirements of twisted pair vary as a function of loop length, which is the total length of the wires in the twisted pair, between the CO and the customer premises. Accordingly, the maximums $S_1$ and $S_2$ are determined depending on the loop length.

To determine a mask in accordance with the preferred embodiment of the present invention, which is spectrally compatible with existing ADSL systems, first, $f_0$ is determined. For an all digital ADSL loop, $f_0$ is one times the bandwidth of a tone, i.e., $f_0=1*4.3125$ kHz; for ADSL over POTS, $f_0=6*4.3125$ kHz; for ADSL over ISDN, $f_0=32*4.3125$ kHz. Likewise, for an all digital ADSL loop over POTS or ISDN, $f_0=1*4.3125$ kHz. In all cases, the maximum power P is limited to 12.5 dBm, the maximum amount of power, measured at the transmitter output, allowed in the upstream passband by the ADSL Standard.

Once $f_0$ is known, a set of values is generated, which can then be stored in a table in memory, for efficient access, either at the end user or at the central office, but this is not required in the practice of the invention. It is merely required that the values be generated and be made available in some manner for subsequent steps, as described below. The values are generated, in the following manner. A loop length is chosen, for example, 6 kft. The frequencies $f_1$ and $f_2$ are chosen. Then, using trial and error and known procedures, the maximum value for $S_2$ is determined, which is able to pass all of the defined spectral compatibility tests required by the spectrum management standard. Specifically, at the present time, those tests are set forth in the "Draft proposed American National Standard, Spectrum Management for Loop Transmission Systems, Issue 2," T1E1.4/2001-002R3, February 2002 (hereinafter, the "Draft Standard"), which is hereby incorporated herein by reference. The maximum value for $S_2$ thus determined is then put in the table at the intersection of the loop length and crossover frequency $f_2$. The generation of the table may advantageously be done offline.

Specifically, the values for the table are generated as follows. First, a loop length is chosen, for example 6 kft. Second, frequencies $f_1$ and $f_2$ are chosen. For simplicity, in the embodiment discussed in detail herein, frequency $f_1$ is chosen to be 138 kHz for all table values. Thus, the second step involves choosing only frequency $f_2$ in this embodiment. In other embodiments the frequency $f_1$ may be allowed to vary as well. Using the defined spectral compatibility tests in the Draft Standard, the maximum value for $S_2$ is determined which is able to pass all the tests, as described in the previous paragraph. Finally, the maximum value for $S_2$ is placed in the table at the intersection of the loop length and crossover frequency $f_2$.

Note that additional restrictions may be placed on the table, if desired. For example, if a modem only supports crossover frequencies out to a maximum subchannel, for example 64, all columns past that channel may be removed. As another example, if an operator wishes to further restrict or relax the spectral compatibility relative to the Draft Standard, the values of $S_2$ may be adjusted accordingly.

Figure 5:
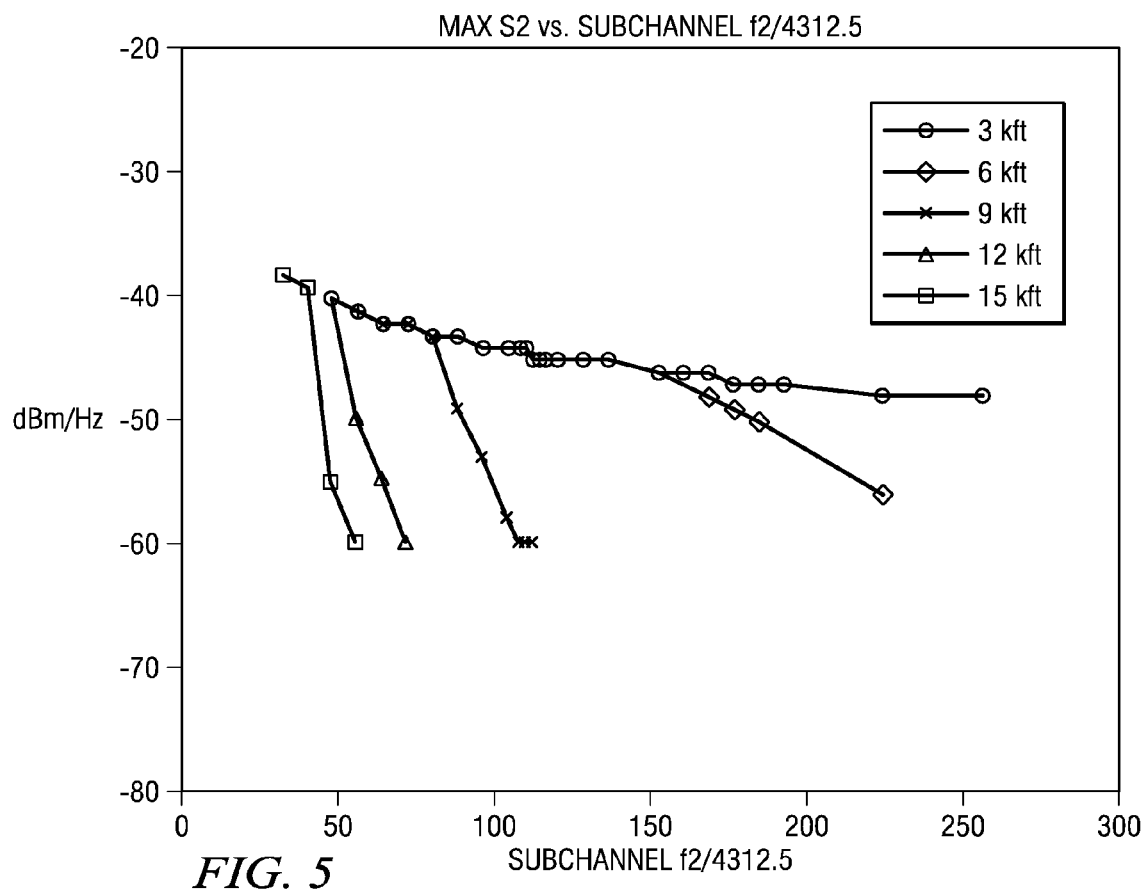
FIG. 5 illustrates graphically the data from Table 1.

Table 1 shows an example of allowed values for $S_2$, in dBm/Hz, for spectral compatibility for ADSL over POTS as a function of loop length and $f_2$, with P=12.5 dBm, $f_0$=6*4.3125 kHz, and $f_1$=31*4.3125 kHz. In constructing the table, the constraint $S_1 \geq S_2$ was imposed. A value of 0 indicates that the resulting PSD for spectral compatibility is below −60 dBm/Hz. The data from Table 1 is also illustrated graphically in FIG. 5. In applying the data from Table 1, once $S_2$ is selected the value of $S_1$ is computed using Equation (2).

approximates the target rate. Note that in this negotiation, known rate negotiation procedures are use. The only modification to the existing procedures is to implement the $f_2$ and $S_2$ cycling. The known rate negotiation procedure are repeated for each pair, and then the pair which best approximates the target rate is simply selected.

Once the mask is thus determined (by the selected $f_2$ and $S_2$), the data is transmitted and received using known techniques, based on this mask.

As an example, consider a 6 kft loop length, with crossover channel 79. In this example:

$f_0 = 6 \times 4312.5$ Hz, $f_1 = 31 \times 4312.5$ Hz, $f_2 = 79 \times 4312.5$ Hz, $P = 12.5$ dBm $= 0.0178$ W, and $S_2 = -43$ dBm/Hz $= 5.0119 \times 10^{-8}$ W/Hz.

Substituting these values into Equation (2) results in:

$S_1 = 6.8714 \times 10^{-8}$ W/Hz $= -41.6$ dBm/Hz.

To check that the total power is 12.5 dBm, substitute the values for $f_0$, $f_1$, $f_2$ $S_1$ and $S_2$ into Equation (1), which yields $P = 0.0178$ W $= 12.5$ dBm.

In general, all of the computations need to be done in linear units (W or W/Hz). Then, the computed values can be converted to dB, dBm, or dBm/Hz for easier understanding.

TABLE 1

| | $f_2/4.3125$ | | | | | | | | | | | | | | |
|---|---|---|---|---|---|---|---|---|---|---|---|---|---|---|---|
| kft | 31 | 39 | 47 | 55 | 65 | 79 | 95 | 111 | 127 | 151 | 167 | 183 | 191 | 223 | 255 |
| 3 | −38 | −39 | −40 | −41 | −42 | −43 | −44 | −45 | −45 | −46 | −46 | −47 | −47 | −48 | −48 |
| 6 | −38 | −39 | −40 | −41 | −42 | −43 | −44 | −45 | −45 | −46 | −48 | −50 | −51 | −56 | −60 |
| 9 | −38 | −39 | −40 | −41 | −42 | −43 | −53 | −60 | 0 | 0 | 0 | 0 | 0 | 0 | 0 |
| 12 | −38 | −39 | −40 | −50 | −55 | 0 | 0 | 0 | 0 | 0 | 0 | 0 | 0 | 0 | 0 |
| 15 | −38 | −39 | −55 | −60 | 0 | 0 | 0 | 0 | 0 | 0 | 0 | 0 | 0 | 0 | 0 |

Next, during training, the modems estimate the loop length, using known techniques. Then, based on the estimated loop length and the pre-computed table, a set of allowed upstream masks is known—as a row in the table. Optionally, an interpolated loop length set of mask values may be determined, by interpolating the set of mask values between possible loop lengths closest to the estimated loop length. Then, the loop length set of masks is selected that is just longer than the estimated loop length, i.e., the shortest loop length that is longer than the estimated loop length. This provides a technique for increasing the effective "granularity" of the loop length data, and thus maximize the effectiveness of the implementation.

Figure 6:
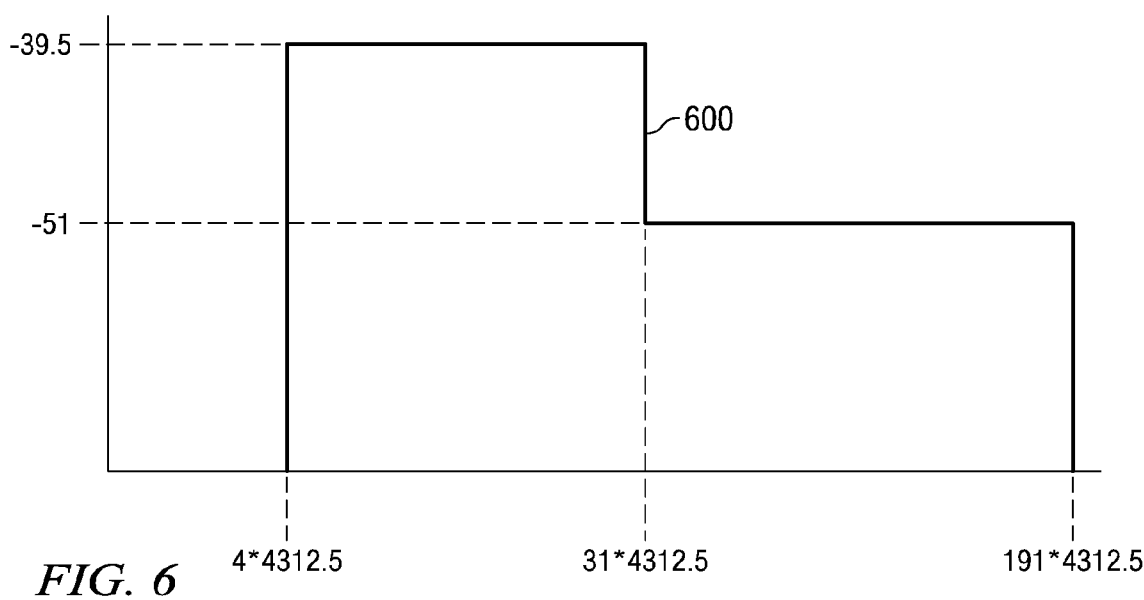
FIG. 6 shows a mask for an example of an embodiment of the present invention.

The modems then select the appropriate mask, being a combination of $f_2$ and $S_2$, from the allowed set, i.e. the row in the table, to best approximate the target upstream and downstream data rates. The procedure for doing this is as follows. During the signal-to-noise ratio ("SNR") estimation portion of training, the different possibilities of $f_2$ and $S_2$ are cycled through for the estimated loop length, and the CO and CPE negotiate to determine the $f_2$, $S_2$ pair which best FIG. 6 shows the resulting mask for another example, a 6 kft loop with $f_2 = 191 \times 4.3125$ kHz, with $S_2$ chosen from Table 1, and $S_1$ computed using Equation (2). As can be seen, $S_2$ is −51 dBm, from the table.

Figure 7:
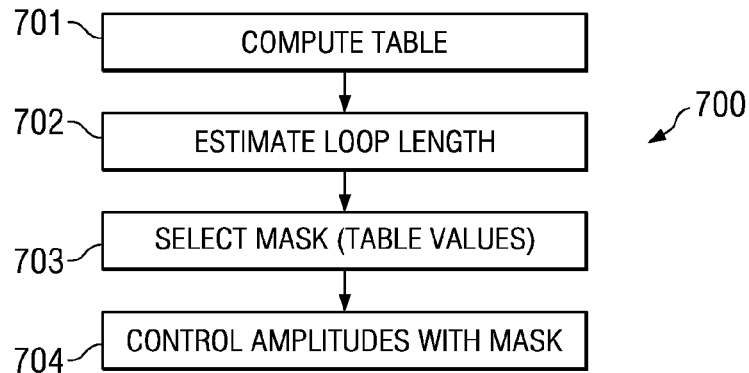
FIG. 7 is a flow chart showing an embodiment of the present invention.

In summary, in the practice of the method of the best mode of the present invention, the following steps are performed. These steps are depicted in a flow chart 700 shown in FIG. 7. First (step 701), a table is constructed, using the principles described above, which indicates the maximum value of $S_2$ for spectral compatibility as a function of loop length, and this table is stored for reference later. The frequencies $f_1$ and $f_2$ are also chosen at this time. In the next step (step 702), during training, the modems estimate the loop length. Following that (step 703), based on the estimated loop length and previously constructed table, a set of allowed upstream masks is thereby determined, i.e., as a row in the table. The maximum value of $S_2$ is a function of $f_1$, and $S_2$ is determined by doing the calculation of Equation (2). In the next step (step 704), the modems select the appropriate mask, i.e., a combination of $f_2$ and $S_2$, to best approximate the target upstream and downstream data rates. Finally (step 705), based on the selected mask, the amplitudes of the transmitted signals from the modems are controlled so as not to exceed the selected mask limits at their respective frequencies. This control is easily implemented in the gain stage 24, and, optionally, also in the channel separator 40 (FIG. 2). Note that some of the steps set forth above are not sequence-critical, and may be re-arranged in sequence from what is set forth above.

Figure 8:
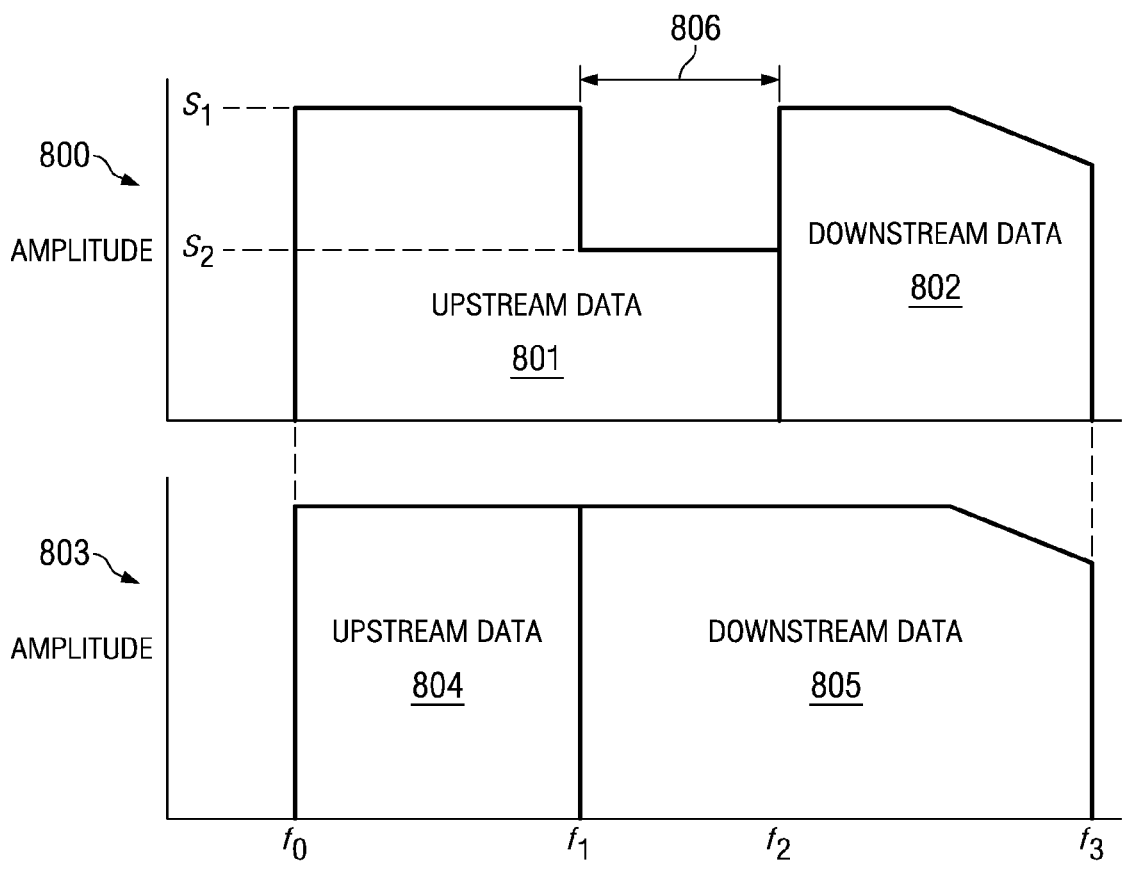
FIG. 8 shows two graphs, aligned by frequency, the upper graph showing a mask for a communication using a mask modified according to an embodiment of the present invention, and the lower graph showing an unmodified mask, showing minimized NEXT interference.

FIG. 8 includes two graphs, the upper graph showing a mask 800 for an ADSL communication, modified in accordance with an embodiment of the present invention, including an upstream mask 801, and a downstream mask 802. The lower graph in the figure shows a mask 403 for communications for existing ADSL communications according to the currently adopted standard, including an upstream mask 804 and a downstream mask 805. Were the communications represented by these two graphs to be conducted simultaneously on twisted pair wires in the same bundle, a near end cross talk (NEXT) interference would occur, with the modified communication upstream data interfering with the non-modified communication downstream data, but only in the frequency range between frequencies $f_1$ and $f_2$. In addition, since the maximum allowable power $S_2$ in this range has been diminished in accordance with the inventive principles described above, this NEXT interference has been minimized to acceptable levels.

Although the present invention and its advantages have been described in detail, it should be understood that various changes, substitutions and alterations can be made herein without departing from the spirit and scope of the invention as defined by the appended claims.

For example, the ATU-C could pass the table describing to the ATU-R, allowing different splits with different compatibility restraints. Other variations are well within the scope of those of ordinary skill in this art.

What is claimed is:

1. A method for providing extended upstream data transmission in a band having a lowest frequency $f_0$ by an end user terminal unit in an asymmetric digital subscriber line communication between a central office terminal unit and the end user terminal unit, comprising the steps of:

providing a target rate of upstream data transmission;

determining a plurality of sets of values of:

an extension frequency $f_2$ that is higher than a frequency $f_1$ for upstream data transmission, $f_1$ being a frequency established for non-extended upstream data transmission, the region bounded by $f_1$ and $f_2$ being an extension band for upstream data transmission, and a maximum power level $S_2$ for the extension band determined by the extension frequency in the sets of values;

selecting, using both terminal units, a selection set of values performing a signal-to-noise ratio determination for each of the sets of values and determining the set of values that results in an upstream data rate that approximates the target rate; and transmitting data upstream by the end user terminal unit using the selection set of values, wherein $f_1$ corresponds to a minimum frequency for downstream data transmission, and wherein a maximum power level $S_1$ in a region bounded by $f_0$ and $f_1$ is determined by selecting a total power P for the upstream data transmission, and then computing $$S_1 = \frac{P - S_2(f_2 - f_1)}{f_1 - f_0}.$$

2. A method according to claim 1 wherein the plurality of sets of values are stored in a table in a memory in the central office terminal unit.

3. A method according to claim 1 wherein the plurality of sets of values are stored in a table in a memory in the central office terminal unit.

4. A method for providing extended upstream data transmission in a band having a lowest frequency $f_0$ by an end user terminal unit in an asymmetric digital subscriber line communication between a central office terminal unit and the end user terminal unit, comprising the steps of:

providing a target rate of upstream data transmission;

determining a plurality of sets of values of:

an extension frequency $f_2$ that is higher than a frequency $f_1$ for upstream data transmission, $f_1$ being a frequency established for non-extended upstream data transmission, the region bounded by $f_1$ and $f_2$ being an extension band for upstream data transmission, and a maximum power level $S_2$ for the extension band determined by the extension frequency in the sets of values;

selecting, using both terminal units, a selection set of values performing a signal-to-noise ratio determination for each of the sets of values and determining the set of values that results in an upstream data rate that approximates the target rate; and transmitting data upstream by the end user terminal unit using the selection set of values, and wherein the plurality of sets of values are determined by the further steps of:

(a) selecting a loop length;

(b) selecting a value for $f_1$;

(c) selecting a value for $f_2$;

(d) determining a maximum power level $S_2$ for the selected values of $f_1$ and $f_2$ by conducting spectral compatibility tests for the selected values and determining the maximum value for $S_2$ that passes the spectral compatibility tests; and (e) repeating steps (a) through (d) until the plurality of sets of values are determined.

5. A method as in claim 4, wherein the value for $f_1$ is the same for all of the plurality of sets of values.

6. A method for providing extended upstream data transmission in a band having a lowest frequency $f_0$ by an end user terminal unit in an asymmetric digital subscriber line communication between a central office terminal unit and the end user terminal unit, comprising the steps of:

providing a target rate of upstream data transmission;

determining a plurality of sets of values of:

an extension frequency $f_2$ that is higher than a frequency $f_1$ for upstream data transmission, $f_1$ being a frequency established for non-extended upstream data transmission, the region bounded by $f_1$ and $f_2$ being an extension band for upstream data transmission, and a maximum power level $S_2$ for the extension band determined by the extension frequency in the sets of values;

selecting, using both terminal units, a selection set of values performing a signal-to-noise ratio determination for each of the sets of values and determining the set of values that results in an upstream data rate that approximates the target rate; and transmitting data upstream by the end user terminal unit using the selection set of values, and wherein the plurality of sets of values are determined for a plurality of possible loop length values, and wherein the plurality of sets of values are arranged by possible loop length value.

7. A method as in claim 6, wherein before the step of selecting, the step of estimating the loop length of the asymmetric digital subscriber line communication is performed, and wherein the step of selecting is performed by performing the signal-to-noise ratio determination on only the sets of values determined for the possible loop length closest to the estimated loop length.

8. A method as in claim 6, wherein before the step of selecting, the step of estimating the loop length of the asymmetric digital subscriber line communication is performed, and wherein the step of selecting is performed by:

performing the signal-to-noise ratio determination on the sets of values determined for the possible loop length closest to the estimated loop length;

interpolating between the sets of values determined for the possible loop length closest to the estimated loop length to obtain a further possible loop length; and selecting the shortest [such] possible loop length that is longer than the estimated loop length.

* * * * *